United States Patent
Burnett

(10) Patent No.: US 10,073,877 B2
(45) Date of Patent: Sep. 11, 2018

(54) DATA PROCESSING FLOW OPTIMIZATION

(71) Applicant: International Business Machines Corporation, Armonk, NY (US)

(72) Inventor: Ian S. Burnett, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 14/736,762

(22) Filed: Jun. 11, 2015

(65) Prior Publication Data
US 2016/0364461 A1  Dec. 15, 2016

(51) Int. Cl.
*G06F 7/00* (2006.01)
*G06F 17/30* (2006.01)
*G06F 7/22* (2006.01)

(52) U.S. Cl.
CPC .......... *G06F 17/30345* (2013.01); *G06F 7/22* (2013.01)

(58) Field of Classification Search
CPC ......... G06F 17/30595; G06F 17/30345; G06F 7/22; Y10S 707/99953
USPC ...... 707/752, 999.007, 999.202, 753, 999.07
See application file for complete search history.

(56) References Cited

U.S. PATENT DOCUMENTS

| | | | | |
|---|---|---|---|---|
| 6,182,266 B1 * | 1/2001 | Clutter | .................... | G06F 11/08 365/218 |
| 6,434,560 B1 * | 8/2002 | Case | ........................ | G06F 7/24 707/752 |
| 7,797,326 B2 | 9/2010 | Gopalan et al. | | |
| 8,843,502 B2 * | 9/2014 | Elson | ................ | G06F 17/30988 707/752 |
| 2011/0270792 A1 * | 11/2011 | Browne | ............... | G06K 9/6277 706/48 |
| 2013/0124255 A1 | 5/2013 | Patterson et al. | | |
| 2013/0226909 A1 | 8/2013 | Katsunuma et al. | | |
| 2014/0168730 A1 * | 6/2014 | Nakamura | ............. | H04N 1/047 358/498 |

FOREIGN PATENT DOCUMENTS

EP   2676189 B1   10/2014

OTHER PUBLICATIONS

"The SORT Procedure: Concepts: SORT Procedure"; SAS; Base SAS(R) 9.2 Procedures Guide; provided on the search report dated Dec. 15, 2014, SAS Institute Inc.; Printed on: May 1, 2015; pp. 1-4; <http://support.sas.com/documentation/cdl/en/proc/61895/HTML/default/viewer.htm#a002473663.htm>.
U.S. Appl. No. 14/938,876, entitled "Data Processing Flow Optimization", filed Nov. 12, 2015.
Appendix P List of IBM Patents or Patent Applications Treated as Related.

\* cited by examiner

*Primary Examiner* — Md I Uddin
(74) *Attorney, Agent, or Firm* — Christopher K. McLane

(57) ABSTRACT

One or more processors evaluate whether a subset of a dataset is sorted. One or more processors process the dataset if it is determined that the subset of the dataset is sorted.

12 Claims, 7 Drawing Sheets

Sort Optimization Module 200

Data Subset Selector 202

Threshold Register 204

Sort Direction Engine 206

First Register 208

Second Register 210

Sort Determination Engine 212

Sort Optimization Method 300

FIG. 2

DATA PROCESSING FLOW OPTIMIZATION

BACKGROUND

Embodiments of the present invention relate to a method and apparatus for data processing flow optimization.

Embodiments of the present invention operate in the general environment of data processing flow.

SUMMARY

Embodiments of the present invention provide a method, system, and program product for optimizing data processing flow. One or more processors evaluate whether a subset of a dataset is sorted. One or more processors process the dataset if it is determined that the subset of the dataset is sorted.

BRIEF DESCRIPTION OF THE DRAWINGS

FIG. 2 is a component diagram of a preferred embodiment.

DETAILED DESCRIPTION

Figure 1:
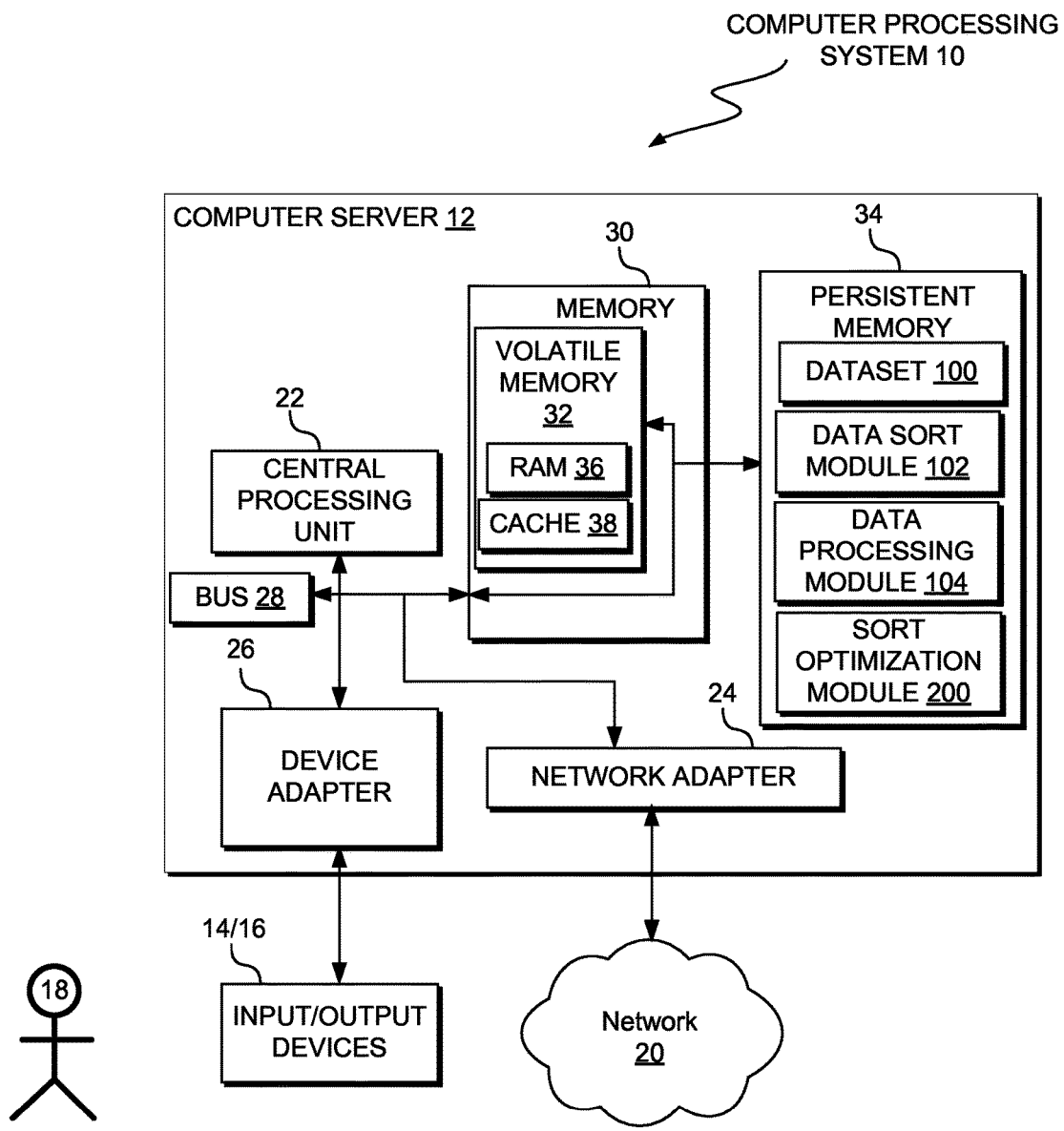
FIG. 1 is a deployment diagram of a preferred embodiment.

Many data processing operations require the input data set to be sorted for correct operation of the algorithm. Processing time must therefore be spent sorting the input, ready for the main data processing step. Should the input dataset already be sorted, then the pre-processing sort operation represents wasted processing cycles. Given that the process of sorting data has a minimum lower bound of operations, this can be a significant cost. Furthermore, the lower bound is dependent on the size of the input dataset. Depending on the sort algorithm implementation, data storage area usage (for example main memory) can also involve a significant overhead.

In one embodiment of the present invention there is provided a system for data processing a dataset, the system comprising: a sort determination engine for evaluating if a subset of the dataset is sorted; and a data processing engine for data processing the dataset if the data subset is evaluated as sorted.

In another embodiment of the present invention there is provided a method for data processing a dataset, the method comprising: evaluating if a data subset of the dataset is sorted; and data processing the dataset if the data subset is evaluated as sorted.

The embodiments describe a technique that can reduce the cost of processing data by evaluating the likelihood a pre-processing sort step is required.

The embodiments take the data subset and analyze that subset for "sortedness", that is, if the data is sorted or not.

If the data subset is already sorted then the embodiments assume that the data set is already sorted. If the data subset is assumed to be already sorted then the pre-processing sort step is skipped completely and the dataset passed directly to the main data processing step. If the main data processing step completes successfully, then performing an unnecessary sort is avoided.

An embodiment of the method further comprises: sorting the dataset if the data subset is evaluated as unsorted before data processing the dataset.

In another embodiment, if the data subset is not sorted, then it must be the case that the dataset is also not sorted, and the pre-processing sort step must be completed as normal.

In another embodiment, the method further comprises: monitoring the data processing step for a data processing interruption due to unsorted data in the dataset; sorting the dataset if a processing interruption has occurred due to unsorted data and re-starting the data processing for the dataset after the dataset has been sorted.

Even more preferably the method further comprises selecting a data subset that is a pre-defined threshold percentage of the dataset.

The number of elements chosen to be sampled is based on a pre-defined threshold. This threshold can range from 0% (where none of the input data is sampled), through to 100% (where all of the input data is sampled). In practice, the threshold would be somewhere in between and tuned for the specific application. A lower threshold would mean the disclosure samples fewer components of the input data set, but has a higher risk of incorrectly reporting the data set as sorted. A higher threshold would mean the disclosure samples a greater proportion of the input dataset, but has a lower risk of having the main data processing step fail due to unsorted input data.

In one embodiment, evaluating if the subset is sorted comprises: determining a sort direction from first and second data in the data subset; if subsequent data in the data subset does not conform with the determined sort direction then returning an unsorted result; and if all the data in the data subset conforms with the determined direction then returning a sorted result.

In another embodiment, the second and subsequent data are incremental data in the dataset.

In another embodiment, the sort direction is determined by determining if the subsequent data is more than or less than the first data.

In another embodiment, the sort direction is determined by determining the sign of the difference between the subsequent data and the first data.

In another embodiment, the data subset is obtained by sampling the dataset at intervals.

This takes a sampled subset of the input data, sampling could be tuned for various typical input patterns. A simple approach for an input set would be to take every n elements, where n is <<input set size. A more complex approach could analyze more closely the head and the tail of the data, with fewer samples taken from the central section. As an example, in an input set of size 128 elements, one may wish to sample elements 1, 2, 4, 8, 16, 32, 64, 96, 112, 120, 124, 126, 127, and 128. Element indices calculated as $2^n$ from both head and tail.

In another embodiment of the present invention there is provided a computer program product for data processing a dataset, the computer program product comprising a computer-readable storage medium (or media) having computer-readable program instructions thereon for causing a processor to perform the following steps:

evaluating if a subset of the dataset is sorted; and data processing the dataset if the subset is evaluated as sorted.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment for example where a computer processing systems are distributed in a network of objects that can interact with a computing service.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises: dataset 100; data sort module 102; data processing module 104 and sort optimization module 200. In one embodiment, ROM in the memory 30 stores module 200 that enables the computer server 12 to function as a special purpose computer specific to the module 200. Further program modules that support the preferred embodiment but are not shown include firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Dataset 100 comprises a set of data, sorted or unsorted, to be operated on by data sort module 102, data processing module 104, and sort optimization module 200. The data set is typically an orderable set of number record fields, for example, integer, floating point numbers. The order envisaged in the preferred embodiment is ascending or descending numerical order. Any type of field including text fields that can be sorted by ascending or descending order can be included. The example of the preferred embodiment is data including one sortable field but embodiments that have two or more sortable fields are envisaged.

Data sort module 102 takes as input criteria a part or whole dataset, one or more fields for sorting with corresponding directions of sort and returning the part or whole dataset as sorted according to the input criteria.

Data processing module 104 can be any type of data processing that takes a sorted dataset and returns a processed dataset. However, if the dataset is not sorted then the data processing module 104 returns an error and stops data processing.

Sort optimization module 200 facilitates the data processing and sorting of a dataset.

Referring to FIG. 2, sort optimization module 200 comprises: data subset selector 202; threshold register 204; sort direction engine 206; first register 208; second register 210; sort determination engine 212; and sort optimization method 300.

Data subset selector 202 is for selecting a subset of the full data set according to the threshold register 204.

Threshold register 204 stores the value for determining size of subset expressed as a percentage of the dataset. The number of elements chosen to be sampled is based on a pre-defined threshold. This threshold can range from 0% (where none of the input data is sampled), through to 100% (where all of the input dataset is sampled). In practice, the threshold would be somewhere in between and tuned for the specific application. A lower threshold would mean the disclosure samples fewer components of the input dataset, but has a higher risk of incorrectly reporting the dataset as sorted. A higher threshold would mean the disclosure samples a greater proportion of the input dataset, but has a lower risk of having the main data processing step fail due to unsorted input data.

Sort direction engine 206 is for determining a sort direction for some data in the data subset.

First register 208 is for holding a first value of a dataset for sort determination.

Second register 210 is for holding a subsequent value of a dataset for sort determination.

Sort determination engine 212 is for determining if the remaining data in the subset corresponds to the sort direction.

Figure 3:
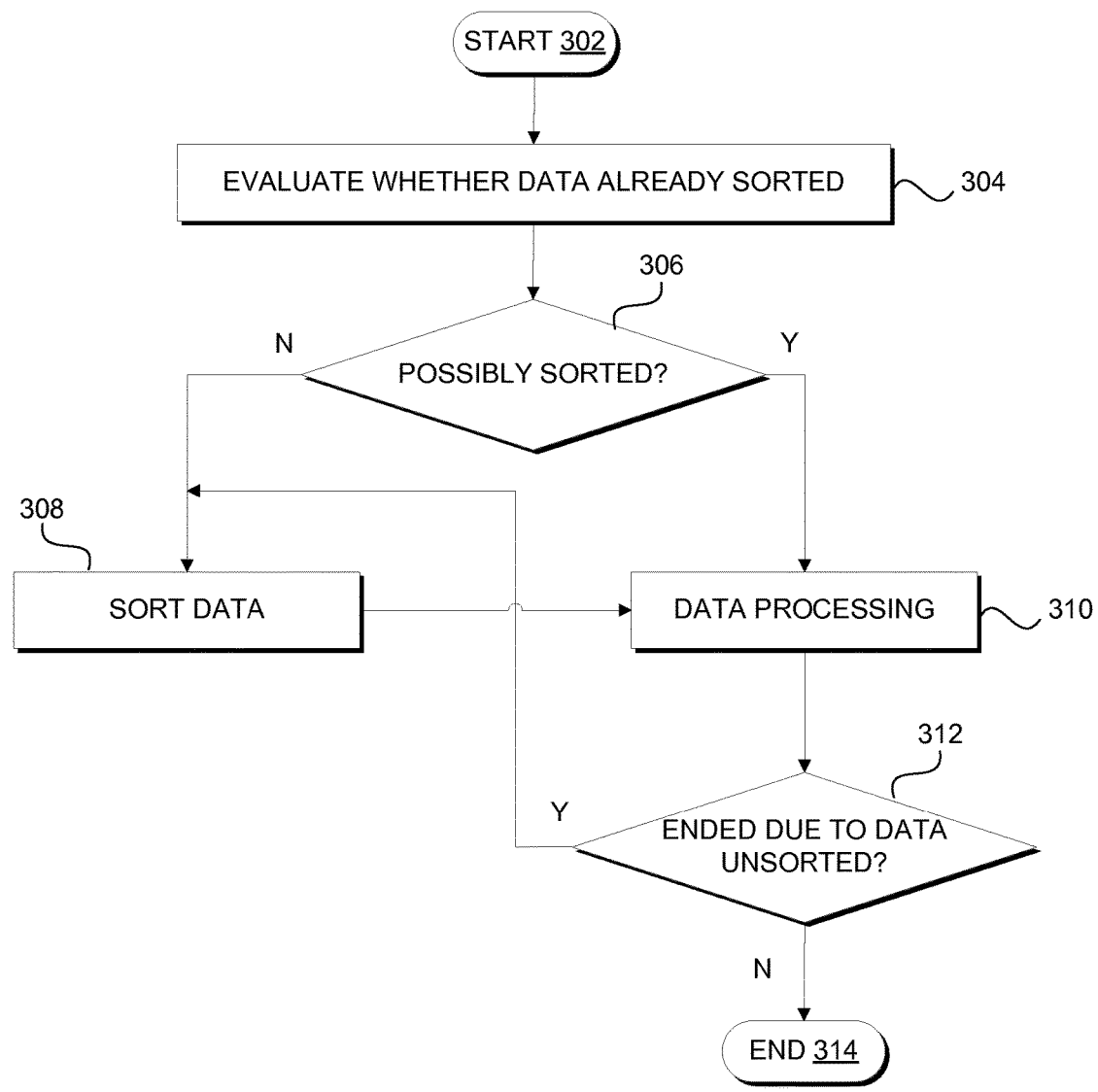
FIG. 3 is a flow diagram of the main process of a preferred embodiment.

Referring to FIG. 3, sort optimization method 300 comprises logical process steps 302 to 314.

Step 302 is the start of the method when initiated directly by a user or another process.

Step 304 is for evaluating if the data may be already sorted. Further details of how this step is performed is described with reference to FIGS. 4 and 5.

Step 306 is for branching to step 310 if the dataset is potentially sorted. Else step 308.

Step 308 is for sorting the dataset by calling data sort module 102.

Step 310 is for processing the dataset by calling data processing module 104.

Step 312 is for branching to step 308 if the data processing step ends due to an error of unsorted input data. Else step 314.

Step 314 is the end of sort optimization method 300.

Figure 4:
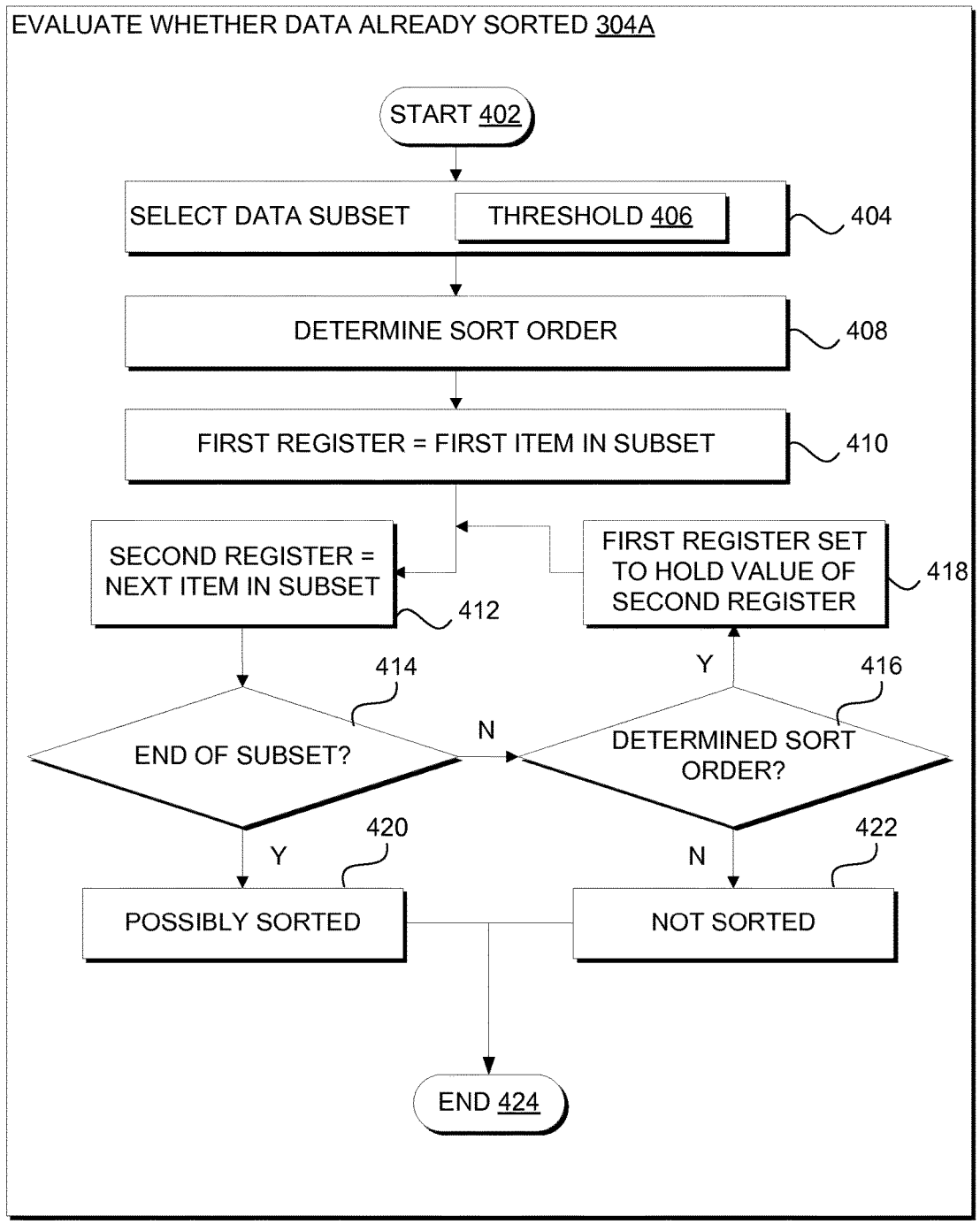
FIG. 4 is a flow diagram of a preferred embodiment process of evaluating how a statistical likelihood of the input data being sorted is evaluated without scanning the whole input dataset.

Referring to FIG. 4, evaluate if data already sorted step 304 in the preferred embodiment is step 304A comprising logical process steps 402 to 424.

Step 402 is the start of the process when called from step 304.

Step 404 is for selecting a subset of data from the dataset with elements in the order in which they appear in the dataset. The subset is a percentage of the full set according to threshold register 204. The subset is chosen as consecutive data items in the preferred embodiment but in a variation of the preferred embodiment the subset of data can be is obtained by sampling the dataset at intervals.

Step 406 is for setting threshold register 204 to a value between 1 to 100% according to user selection.

Step 408 is for determining the sort order of a first and second item in the subset.

Step 410 is for loading first register 208 with a first item in subset.

Step 412 is for loading second register 210 with the next item in the subset.

Step 414 is for branching to step 416 if the end of the subset is not reached. Else step 420.

Step 416 is for branching to step 418 if the previous item and the current item have the same determined sort order. If they have a different sort order then step 422.

Step 418 is for setting the first register to hold the item of the second register. Next step 412 and the loop repeats until the end of the subset.

Step 420 is reached if the all the data items in the subset have been tested and are consistent with the determined sort order. A result of possibly sorted is returned and the process ends at step 424.

Step 422 is reached if a single data item in the subset is not consistent with the determined sort order. A result of not sorted is returned and the process ends at step 424.

Step 424 is the end of step 304A evaluate if data is already sorted.

The interval sampling variation takes a sampled subset of the input data, sampling could be tuned for various typical input patterns. A simple approach for an input set would be to take every n elements, where n is <<input set size. A more complex approach could analyze more closely the head and the tail of the data, with fewer samples taken from the central section. As an example, in an input set of size 128 elements, you may wish to sample elements 1, 2, 4, 8, 16, 32, 64, 96, 112, 120, 124, 126, 127, and 128. Element indices calculated as $2^n$ from both head and tail.

Figure 5:
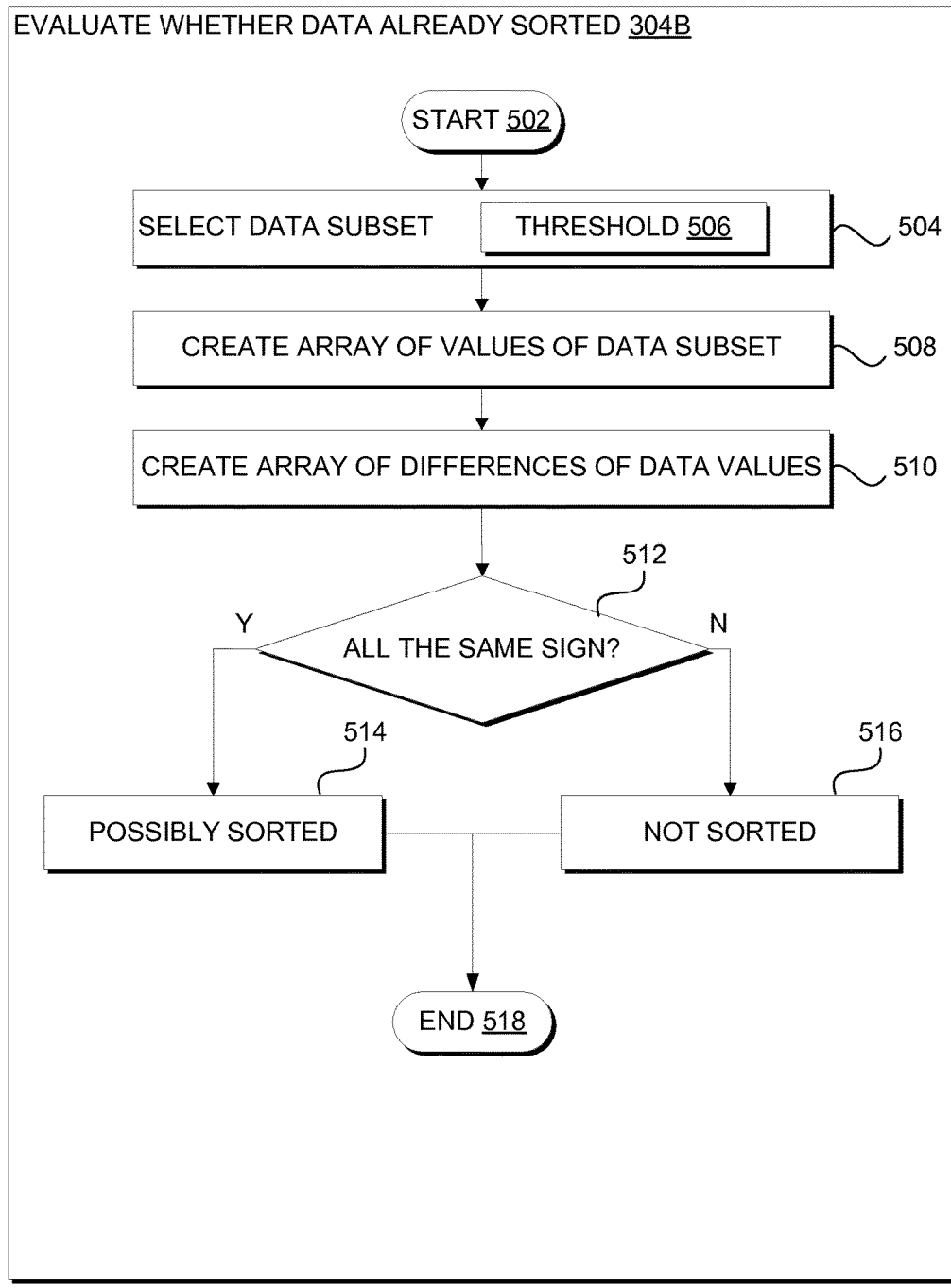
FIG. 5 is a flow diagram of an alternative embodiment process of evaluating how a statistical likelihood of input data being sorted is evaluated without scanning the whole input dataset.

Referring to FIG. 5, evaluate if data already sorted step 304 in an alternative embodiment is step 304B comprising logical process steps 502 to 518.

Step 502 is the start of the process when called from step 304.

Step 504 is for selecting a subset from the dataset with elements in the order in which they appear in the dataset. The subset is a percentage of the dataset according to threshold register 204.

Step 506 is for setting threshold register 204 to a value between 1 to 100% according to user selection.

Step 508 is for creating an array of values of the data subset.

Step 510 is for creating an array of the differences between adjacent values of the data set.

Step 512 is for branching to step 514 if all the differences are the same sign. Else one or more of the differences has a different sign and step 516.

Step 514 is reached if the all the differences are the same sign. A result of possibly sorted is returned and the process ends at step 518.

Step 516 is reached if one or more differences has a different sign than other differences. A result of not sorted is returned and the process ends at step 518.

Step 518 is the end of step 304B evaluate if data is already sorted.

Figure 6A:
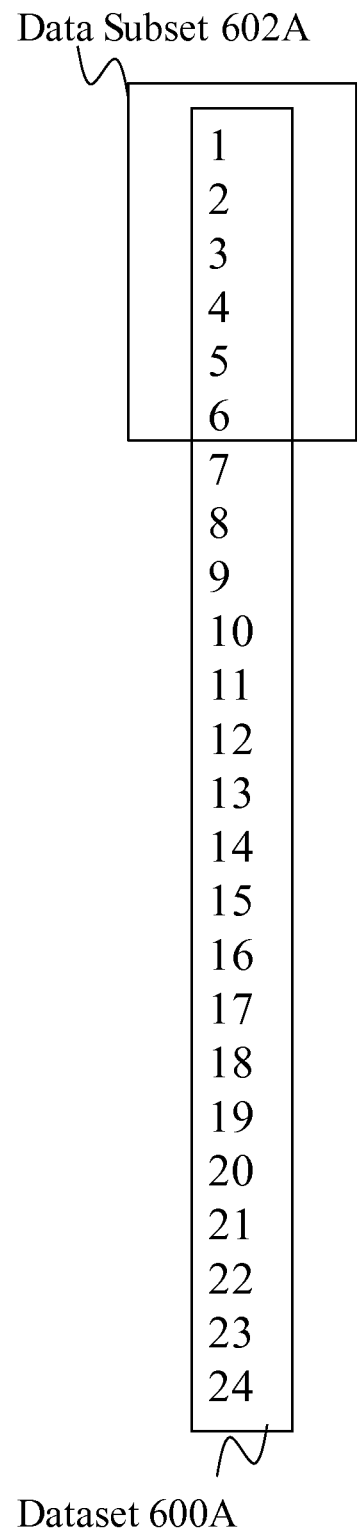
FIGS. 6A and 6B are examples of datasets and subsets for sorted and unsorted data respectively.
Figure 6B:
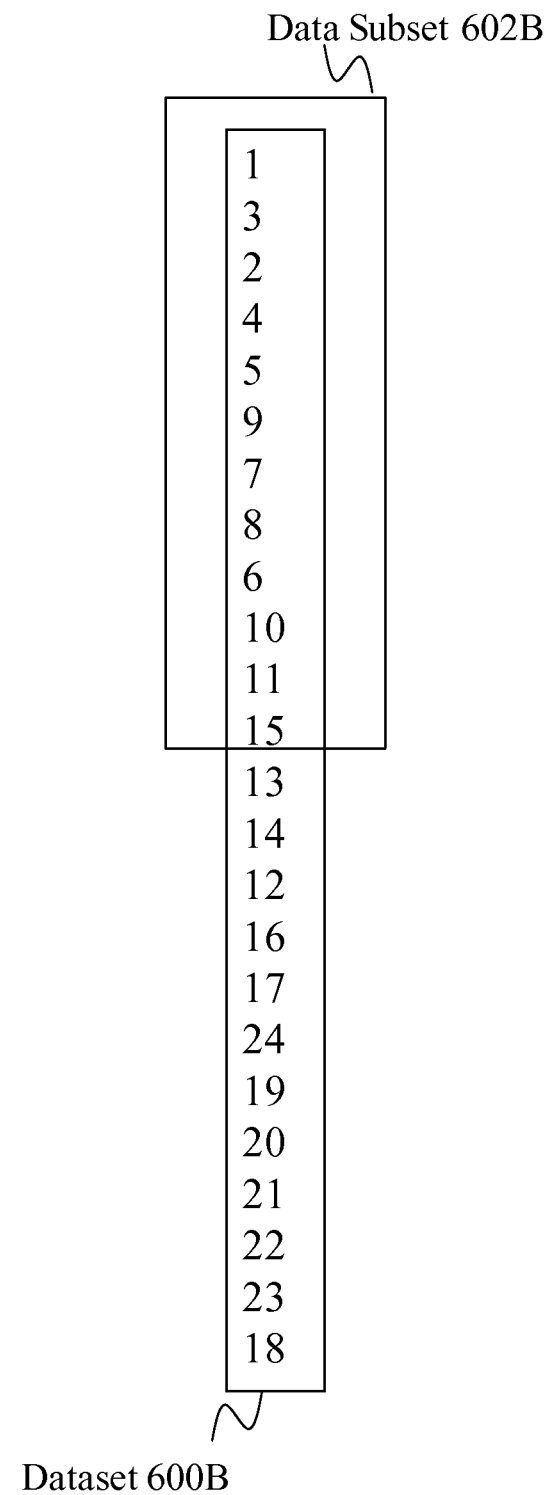

Referring to FIGS. 6A and 6B, a first and second example of datasets (600A and 600B) and data subsets (602A and 602B) for sorted and unsorted data are described respectively.

In the first example, dataset 600A comprises the numbers 1 to 24 sorted in ascending order. The threshold is set for 25% and subset 602A is therefore the first 25% or first six items of data. The embodiments will determine that the first six items 602A of data are sorted in ascending order and dataset 600A is asserted as possibly sorted. According to the embodiments therefore data processing will be performed on dataset 600A without sorting.

In the second example, dataset 600B comprises the numbers 1 to 24 that are partially sorted and therefore unsorted. The threshold is set for 50% and subset 602B is therefore the first 50% or first twelve items of data. The embodiments will determine that the first twelve items 602B of data are not sorted (for example 1, 3, 2 are not in ascending or descending order) and dataset 600B is asserted as not sorted. According to the embodiments therefore the dataset 600B set will be subject to full sorting before data processing will be performed.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment of the present invention, it may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A computer system for reducing unnecessary processing cycles comprising:
   one or more computer processors;
   one or more computer-readable storage medium; and
   program instructions stored on at least one of the one or more computer-readable storage medium for execution by at least one of the one or more processors, the program instructions comprising:
   program instructions to select a subset of a dataset;
   program instructions to identify a number "n," wherein the "n" is an input set size of the subset of the dataset;
   program instructions to sample the dataset at intervals, wherein the intervals are calculated as element indices from a beginning and an end of the dataset based on a base number raised to a power that covers 0 to "n";
   program instructions to determine whether the subset of a dataset is sorted;
   program instructions to determine a sign of difference between a first data and a second data, wherein the sign of difference is based on one of the following: the second data is more than the first data, the second data is equal to the first data, and the second data is less than the first data, wherein the sign of difference is between adjacent values in the dataset;
   program instructions to determine a sort direction from a first data and a second data in the subset of the dataset, wherein the sort direction is based on the determined sign of difference;
program instructions to determine a sign of difference between the first data and a third data;
program instructions to determine a sort direction from the first data and the third data in the subset of the dataset;
program instructions to determine whether the dataset is sorted by determining whether the sort direction from the first data and the third data conforms to the sort direction from the first data and the second data;
responsive to determining that the subset of the data is not sorted, program instructions to sort the dataset; and
program instructions to process the dataset.

2. The computer system of claim 1 further comprising:
program instructions to determine whether a processing error has occurred, wherein the processing error is caused, at least in part, by processing an unsorted dataset;
program instructions to sort the unsorted dataset thereby creating a sorted dataset; and
program instructions to reprocess the sorted dataset.

3. The computer system of claim 1, wherein to select a subset of a dataset further comprises:
program instructions to identify a pre-defined threshold percentage of the dataset;
program instructions to determine a size of the subset based on the pre-defined threshold percentage; and
program instructions to select the subset from the dataset based on the size.

4. The computer system of claim 1, wherein the second data and the third data are incremental data in the dataset.

5. The computer system of claim 4, wherein the sort direction is determined, at least in part, by determining if the third data is greater than, less than, or equal to the first data.

6. The computer system of claim 4, wherein the sort direction is determined, at least in part, by determining a sign of a difference between the third data and the first data, wherein the sign of difference is between adjacent values in the dataset.

7. A computer program product for reducing unnecessary processing cycles comprising:
one or more computer-readable storage medium having program instructions therewith, the program instructions executable by a computer to cause the computer to:
select a subset of a dataset;
identify a number "n," wherein the "n" is an input set size of the subset of the dataset;
sample the dataset at intervals, wherein the intervals are calculated as element indices from a beginning and an end of the dataset based on a base number raised to a power that covers 0 to "n";
determine whether the subset of a dataset is sorted;
determine a sign of difference between a first data and a second data, wherein the sign of difference is based on one of the following: the second data is more than the first data, the second data is equal to the first data, and the second data is less than the first data, wherein the sign of difference is between adjacent values in the dataset;
determine a sort direction from a first data and a second data in the subset of the dataset, wherein the sort direction is based on the determined sign of difference;
determine a sign of difference between the first data and a third data, determine a sort direction from the first data and the third data in the subset of the dataset;
determine whether the dataset is sorted by determining whether the sort direction from the first data and the third data conforms to the sort direction from the first data and the second data;
responsive to determining that the subset of the data is not sorted, sort the dataset; and
process the dataset.

8. The computer program product of claim 7 further comprising program instructions, stored on the one or more computer readable storage devices, to:
determine whether a processing error has occurred, wherein the processing error is caused, at least in part, by processing an unsorted dataset;
sort the unsorted dataset thereby creating a sorted dataset; and
reprocess the sorted dataset.

9. The computer program product of claim 7, wherein to select a subset of a dataset further comprises program instructions, stored on the one or more computer readable storage devices, to:
identify a pre-defined threshold percentage of the dataset;
determine a size of the subset based on the pre-defined threshold percentage;
select the subset from the dataset based on the size.

10. The computer program product of claim 7, wherein the second data and the third data are incremental data in the dataset.

11. The computer program product of claim 10, wherein the sort direction is determined, at least in part, by determining if the third data is greater than, less than, or equal to the first data.

12. The computer program product of claim 10, wherein the sort direction is determined, at least in part, by determining a sign of a difference between the third data and the first data, wherein the sign of difference is between adjacent values in the dataset.

* * * * *